United States Patent
Kim et al.

(10) Patent No.: US 6,952,786 B2
(45) Date of Patent: Oct. 4, 2005

(54) DEVICE FOR REDUCING POWER CONSUMPTION OF A MONITOR AND THE METHOD THEREOF

(75) Inventors: Jong-Rin Kim, Icheon-shi (KR); Young-Kab Byun, Icheon-shi (KR)

(73) Assignee: Imagequest Co., Ltd. (KR)

( * ) Notice: Subject to any disclaimer, the term of this patent is extended or adjusted under 35 U.S.C. 154(b) by 544 days.

(21) Appl. No.: 10/128,984

(22) Filed: Apr. 24, 2002

(65) Prior Publication Data

US 2002/0169992 A1 Nov. 14, 2002

(30) Foreign Application Priority Data

Apr. 24, 2001 (KR) ........................................ 2001-21952

(51) Int. Cl.$^7$ ............................................. G06F 1/26
(52) U.S. Cl. ........................ 713/300; 713/310; 713/324
(58) Field of Search ................................ 713/300, 310, 713/324

(56) References Cited

U.S. PATENT DOCUMENTS

| | | | | |
|---|---|---|---|---|
| 6,084,355 A | * | 7/2000 | Park ........................... | 315/106 |
| 6,404,423 B1 | * | 6/2002 | Kivela et al. ................ | 345/212 |
| 6,515,655 B1 | * | 2/2003 | Thornblad ................... | 345/211 |
| 6,567,080 B1 | * | 5/2003 | Otsuka ........................ | 345/211 |
| 6,812,920 B1 | * | 11/2004 | Otsuka ........................ | 345/211 |

\* cited by examiner

*Primary Examiner*—Chun Cao
*Assistant Examiner*—Nirav Amin
(74) *Attorney, Agent, or Firm*—Meyertons, Hood, Kivlin, Kowert & Goetzel, P.C.; Eric B. Meyertons

(57) ABSTRACT

The present invention relates to a device for reducing power consumption of a monitor and the method thereof. The device for reducing power consumption of a monitor according to the present invention comprises a control unit which generates a power-saving mode signal according to the control signal inputted from an external signal source; a first switching unit, connected to said control unit, which turns on or off the power according to said power-saving mode signal, in which said power is supplied from the power-supply terminal to the deflection drive terminal; a second switching unit which turns on or off the power supplied from the power-supply terminal to the heater, in which said switching unit operates in the same manner as the first switching unit; and a voltage-drop unit, connected between said power-supply terminal and said heater, which lowers the voltage applied from said power-supply terminal only when said second switching unit is off, and then supplies the same to said heater. By using a device for reducing power consumption of a monitor and the method thereof according to the present invention, the following effects can be obtained: First, since it operates in a single power-saving mode, it provides a simple construct, which in turn results in enhanced effects in terms of production process and costs. Second, power consumption is reduced to less than 5 W while allowing a fast returning time to normal status.

4 Claims, 3 Drawing Sheets

DEVICE FOR REDUCING POWER CONSUMPTION OF A MONITOR AND THE METHOD THEREOF

BACKGROUND OF THE INVENTION

1. Technical Field

The present invention relates to a device for reducing power consumption of a monitor and the method thereof. More particularly, it relates to a device for reducing power consumption of a monitor and the method thereof. Embodiments of the invention have low power consumption and a fast return time to normal operating status while operating in a single mode. Low power consumption and a fast return time are achieved by cutting off the power applied to a deflection drive and a heater according to the control signals inputted from the external signal source, while simultaneously applying a certain amount of dropped voltage to said heater.

2. Background Art

A device for reducing power consumption of a conventional monitor and the method thereof are described as below with references to FIG. 1. FIG. 1 is a schematic which illustrates a conventional device for reducing power consumption of a monitor. In a conventional device, control unit (MCU) 20 continually checks the input status of the vertical synchronized signals (V-SYNC) and the horizontal synchronized signals (H-SYNC) inputted from the external signal source (such as from the motherboard of P.C.). The device pictured in FIG. 1 then outputs a power-saving mode signal to output terminals L1 and L2 according to the input status of the V-SYNC and the H-SYNC signals. Power-supply terminal 30 within monitor 1 is respectively connected to a heater and a deflection drive terminal through two switching circuits which include transistors. The above switching circuits are respectively connected to output terminals L1 and L2 of control unit 20. When output terminals L1 and L2 apply a power-saving mode signal, the switching circuits turn on or off the power source to the heater and the deflection drive terminal as necessary. The above switching circuits respectively include switching transistors Q2 and Q4, in which resistors R2 and R4 are connected between the emitter and the base. The bases are connected to output terminals L1 and L2 and receive the power-saving mode signal therefrom. The bases are connected to the collectors of grounded buffer transistors Q1 and Q3 through resistors $R_1$ and $R_3$. The emitters are connected to power-supply terminal 30. The collectors are respectively connected to the heater and the deflection drive terminal. Two types of power-saving mode signals are respectively applied to the switching circuits connected to the heater and the deflection drive terminal. Switching transistors Q2 and Q4 turn on or off the power applied from power-supply terminal 30 to the heater and the deflection drive terminal. The buffer transistors Q1 and Q3 control the operation of switching transistors Q2 and Q4.

In the conventional device for reducing power consumption of a monitor, there are three types of power-saving modes, i.e., (1) a mode for input of only vertical synchronized signals (V-SYNC), (2) a mode for input of only horizontal synchronized signals (H-SYNC), and (3) a mode for no input of vertical synchronized signals or horizontal synchronized signals. With respect to each case, the operation of said device for reducing power consumption of a monitor is described as follows:

First, during normal operation (i.e., normal input of vertical and horizontal synchronized signals), control unit 20 outputs a high level signal (e.g., 5V) to two output terminals L1 and L2. Consequently, buffer transistors Q1 and Q3 have an "ON" status, by which the base voltage of switching transistors Q2 and Q4 becomes lower than the voltage of the emitter. As such, switching transistors Q2 and Q4 also have an "ON" status. Then, power is supplied to the heater and the deflection drive terminal, and the monitor goes into normal operation.

In Power-saving Mode 1, where there is input of only vertical synchronized signals (V-SYNC) from external signal source 10, control unit 20 senses that the horizontal synchronized signal (H-SYNC) is not being input and therefore outputs a low level signal (e.g., 0V) to output terminal L1 connected to the base terminal of buffer transistor Q1 on the side of the deflection drive terminal. Due to said signal, buffer transistor Q1 now has an "OFF" status, by which switching transistor Q2 also subsequently has an "OFF" status, and then the power to the deflection drive terminal is cut off. Nonetheless, the power to the heater is still being maintained.

In Power-saving Mode 2, where there is input of only horizontal synchronized signals (H-SYNC) from external signal source 10, control unit 20 senses that the vertical synchronized signal (V-SYNC) is not inputted. Therefore control unit 20 outputs a low level signal (e.g., 0V) to output terminal L1 connected to the base of buffer transistor Q1 on the side of the deflection drive terminal. The operations thereafter are the same as those of Power-saving Mode 1.

In Power-saving Mode 3, where there is no input of vertical nor horizontal synchronized signals from the external signal source 10, the control unit 20 senses the absence of input and then outputs low level signals to two output terminals L1 and L2. As such, the power supplied to the heater and the deflection drive terminal is thereby cut off.

With respect to Power-saving Modes 1 and 2, the power consumption is reduced by cutting off power to the deflection drive terminal while maintaining the power to the heater. As such, a fast returning time to the normal operation is still possible. However, there is a disadvantage of significant reduction of power-saving effects since the power is still maintained to the heater.

With respect to Power-saving Mode 3, by cutting off power not only to the heater but also to the deflection drive terminal, the power consumption could be substantially reduced. However, since re-heating is required to return to the normal status, there is a disadvantage of a rather slow returning time.

In other words, in the cases of Power-saving Modes 1 and 2, there is a problem of substantially high power consumption of approximately 10 W although the returning time to the normal status is fast (i.e., approximately three seconds). In the case of Power-saving Mode 3, there is a problem of requiring a longer returning time (2× or more) to normal status, as compared to those of Power-saving Modes 1 and 2 although its approximate power consumption is less than 5 W.

Moreover, with respect to the aforementioned conventional device for reducing power consumption of a monitor, the above control unit continually checks the input status of vertical and horizontal synchronized signals inputted from the external signal source. After determining the mode among three types of power-saving modes according to its input status, and according to its determination, the control unit carries out the functions of outputting signals to the output terminals. In this regard, there is an additional problem in that the designing and manufacturing of a control unit to implement such functions are rather complex.

SUMMARY

The objectives of the present invention are to provide a device for reducing power consumption of a monitor which has a fast returning time to normal status while its power consumption is less than 5 W, and to provide the method thereof.

Other objectives of the present invention are to provide a device for reducing power consumption of a monitor operating in a single power-saving mode, and to provide the method thereof.

In an embodiment, a device for reducing power consumption of a monitor may include a control unit which may generate a power-saving mode signal according to the control signal inputted from an external signal source. The device for reducing power consumption of a monitor may include a first switching unit, coupled to said control unit, which may turn on or off the running power according to said power-saving mode signal, in which said power may be supplied from the power-supply terminal to the deflection drive terminal. The device for reducing power consumption of a monitor may include a second switching unit which may turn on or off the power supplied from the power-supply terminal to the heater, in which said switching unit may operate in the same manner as the first switching unit. The device for reducing power consumption of a monitor may include a voltage-drop unit, coupled to said power-supply terminal and said heater, which may lower the voltage applied from said power-supply terminal to the heater only when said second switching unit is off.

The control signal may be at least one of the horizontal or vertical synchronized signals. The control unit may generate said power-saving mode signal when at least one of the horizontal or vertical synchronized signal is not being inputted.

Moreover, the first switching unit may include a first transistor and a second transistor. The base of the first transistor may be coupled to the control unit and may receive the power saving mode signal. The emitter of the first transistor may be grounded. The base of the second transistor may be coupled to the collector of the first transistor via a first resistor. The emitter of the second transistor may be coupled to the power supply terminal and coupled to the base of the second transistor via a second resistor. The collector of the second transistor may be coupled to the deflection drive terminal.

The second switching unit may include a third transistor. The base of the third transistor may be coupled to the collector of the first transistor via a third resistor and a diode. The emitter of the third transistor may be coupled to the power supply terminal. The emitter of the third transistor may be coupled to the base of the third transistor via a forth resistor. The collector of the third transistor is connected to the heater.

In an embodiment, with respect to a voltage-drop unit, a resistor may be coupled between the emitter and the collector of said third transistor.

A method of reducing power consumption may include the following steps of: (1) checking the input status of horizontal and vertical synchronized signals from the external signal source, and generating the power saving mode signal when at least one of said horizontal and vertical synchronized signals is not inputted; (2) shutting off power applied to the deflection drive terminal and to the heater if a power saving mode signal is applied thereto; (3) lowering the voltage of the power applied to the heater and (4) checking the input status of said horizontal and vertical synchronized signals, and discontinuing the generation of said power saving mode signal if all of said signals are inputted.

DETAILED DESCRIPTION OF EMBODIMENTS

Figure 1:
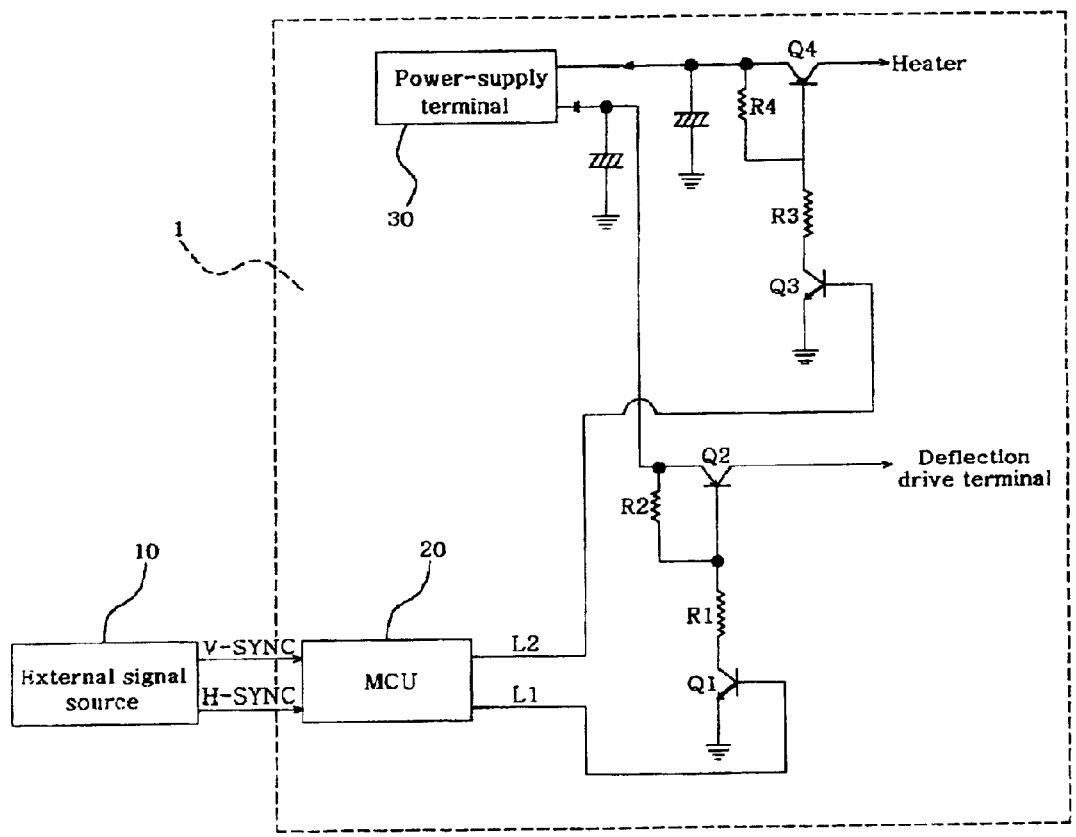
FIG. 1 is a conventional device for reducing power consumption of a monitor.
Figure 2:
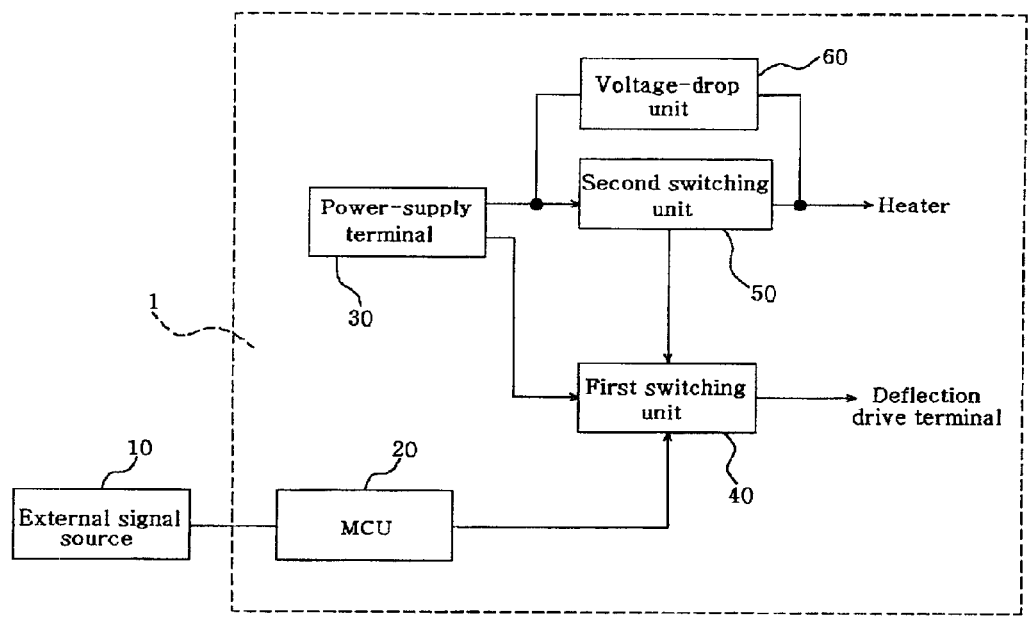
FIG. 2 is a block diagram illustrating the structure of a device for reducing power consumption of a monitor.

FIG. 2 is a block diagram illustrating the structure of a device for reducing power consumption of a monitor. As shown in FIG. 2, the device for reducing power consumption of a monitor may include control unit (MCU) 20 which may receive input of control signals from external signal source 10. The device for reducing power consumption may include first switching unit 40 which may be coupled to control unit 20, which may turn on or off the power applied to a deflection drive terminal according to the power-saving mode signal outputted from control unit 20. The device for reducing power consumption may include a second switching unit 50, which may be coupled to first switching unit 40, which may turn on or off the power applied to the heater. The device for reducing power consumption may include voltage-drop unit 60, which may supply power of dropped voltage to said heater when second switching unit 50 is off.

External signal source 10 may be a device (e.g., a P.C.), which transmits visual signals, etc. to monitor 1 and controls monitor 1 although it may not be exclusively limited to a P.C.

Control unit 20 may check for control signals relevant to power-saving modes among the signals inputted from external signal source 10. The above signals may be vertical and horizontal synchronized signals, and control unit 20 may output a power-saving mode signal when at least one of the horizontal and vertical synchronized signals is not input. The power-saving mode signal may then be applied to first switching unit 40.

When first switching unit 40 receives the power-saving mode signal from control unit 20, the power applied from power-supply source 30 to the deflection drive terminal may be turned off. Simultaneously, second switching unit 50 may turn the power off, which is applied from power-supply terminal 30 to the heater. In other words, first switching unit 40 and second switching unit 50 may work in sync with respect to their "on and off" operations.

Voltage-drop unit 60 may lower the output voltage of power-supply terminal 30 while second switching unit 50 is in the off status and delivers it to said heater. Herewith, the power with voltage lower than that of the normal status is applied to said heater. As such, the power consumption is not only reduced but the time for heating said heater while returning to normal status is short, thereby rapidly returning to the normal status.

Figure 3:
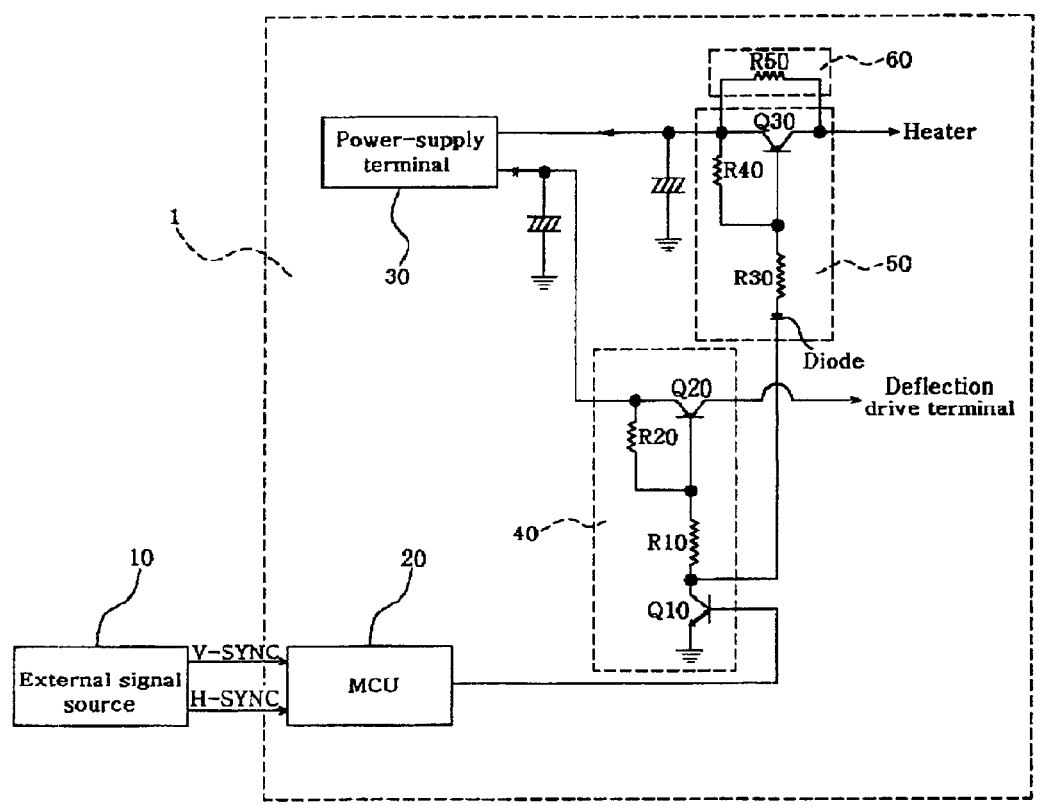
FIG. 3 is an embodiment of a device for reducing power consumption of a monitor.

FIG. 3 is an embodiment of a device for reducing power consumption of a monitor. The control signals inputted from external signal source 10 may be vertical and horizontal synchronized signals (V-SYNC, H-SYNC). Control unit 20 may continually check the input status of said vertical and horizontal synchronized signals, and may output a power-saving mode signal when at least one of them is not inputted.

In an embodiment, first switching unit 40 may include first transistor Q10 as a buffer, and second transistor Q20 as a switching element. Second switching unit 50 may share first transistor Q10 as a buffer with first switching unit 40 and may include third transistor Q30 as a switching element. Voltage-drop unit 60 may be resistor R50 coupled between the ends of second switching unit 50.

In first transistor Q10 of first switching unit 40, the base, which is coupled to control unit 20, may receive a power-saving mode signal. The emitter may be grounded.

In second transistor Q20, the base may be coupled to the collector of first transistor Q10 through resistor R10. The emitter may be coupled to power-supply terminal 30, and the collector may be coupled to the deflection drive terminal. Simultaneously resistor R20 may be coupled between the emitter and the base.

In third transistor Q30, the base may be coupled to the collector of first transistor Q10 through resistor R30 and a diode. The emitter may be coupled to power-supply terminal 30. The collector may be coupled to the heater while simultaneously resistor R40 may be coupled between the emitter and the base. As illustrated in FIG. 3, first transistor Q10 may be an npn-type transistor, and second and third transistors Q20 and Q30 may be pnp-type transistors.

During normal status, where there are inputs of vertical and horizontal synchronized signals from external signal source 10, the control unit may apply a normal mode signal of a high level (e.g., 5V) to the base terminal of first transistor Q10. As such, first transistor Q10 may become "ON" status, and second transistor Q20 and third transistor Q30, in which the base terminal thereof is respectively connected to the collector of first transistor Q10 may become "ON" status as well. As such, power may be supplied to the heater and the deflection drive terminal, and then the monitor runs normally.

In the power-saving mode, when there is no input of one or both of vertical and horizontal synchronized signals from external signal source 10, control unit 20 may apply a power-saving mode signal of a low level (e.g., 0V) to the base of first transistor Q10. As such, first transistor Q10 may become "OFF" status, and second transistor Q20 and third transistor Q30 respectively may become "OFF" status since there is no voltage difference between the respective emitter and the base. When third transistor Q30 becomes "OFF" status, the heater may receive the power of dropped voltage through resistor R50.

And, when second transistor Q20 becomes "OFF" status, there may be no power delivered to deflected drive terminal.

Generally, the voltage and current supplied to the heater during normal status may be approximately 6V and 330 mA, respectively. However, in the case of supplying power through resistor R50 in the power-saving mode as above, there may be a voltage-drop at resistor R50 in the amount of R50×330 mA. As such, in the power-saving mode, power may be supplied to the heater at a voltage of 1.5~2V. Keeping the heater heated even in the power-saving mode, may allow a fast return to the normal status while at the same time supplying power at a voltage lower than that of the normal status, which in the end leads to a reduction in power consumption.

In the power-saving mode, if all of the vertical and horizontal synchronized signals from external signal source 10 are inputted, the monitor may return to the normal status. At that point in time, control unit 20 may output a power-saving mode signal of a high level to the base of first transistor Q10 and thereby turn first transistor Q10 to "ON" status. Consequently, the first and third transistors may then become "ON" status as well, which in turn leads to normal supply of power to said heater and the deflection drive terminal.

In the above embodiment, in terms of power consumption, its effect of reducing power consumption is substantially superior as compared to those of Power-saving Modes 1 and 2. Moreover, it returns to normal status substantially faster as compared to Power-saving mode 3.

The method of reducing power consumption using a device for reducing power consumption of a monitor as above may include the following steps of: (a) checking the input status of horizontal and vertical synchronized signals from the external signal source, and generating the power-saving mode signal when at least one of horizontal and vertical synchronized signals is not inputted; (b) shutting off power applied to the deflection drive terminal and to a heater if the power-saving mode signal is applied thereto; (c) lowering the voltage of the power applied to the heater; and (d) checking the input status of said horizontal and vertical synchronized signals, and discontinuing the generation of said power-saving mode signal if all of said signals are being inputted.

The device for reducing power consumption and the method thereof provide a simple schematic for its circuit since it operates in a single power-saving mode. Since the function of a control unit is simplified, it provides simple manufacturing from the perspectives of software and hardware engineering.

As shown above, by using a device for reducing power consumption of a monitor and the method thereof, the following effects can be obtained: First, since it operates in a single power-saving mode, the device may provide simplicity in terms of software and hardware engineering. Accordingly, the production process thereof may be simplified, which in turn may lead to a reduction of production cost to such an extent. Second, by cutting off normal power supplied to the heater and the deflection drive terminal during power-saving mode while applying lowered voltage to said heater, power consumption may be generally reduced to less than 5 W while allowing a fast returning time to normal status. In the end, it may provide an enhanced device for reducing power consumption of a monitor and the method thereof.

What is claimed is:

1. A device for reducing power consumption of a monitor, the monitor comprising a power supply terminal coupled to a deflection drive terminal and a heater, comprising:

a control unit configured to generate a power-saving mode signal in response to a control signal inputted from an external signal source;

a first switching unit, coupled to the control unit, configured to turn on or off the power supplied from the power-supply terminal to the deflection drive terminal in response to the power-saving mode signal;

a second switching unit coupled to the control unit, configured to turn on or off the power supplied from the power-supply terminal to the heater, in response to the power-saving mode signal; and a voltage-drop unit, coupled to the power-supply terminal and the heater, configured to lower the voltage applied from the power-supply terminal to the heater when the second switching unit is off;

wherein the first switching unit comprises a first transistor, comprising:

a first collector, a first emitter and a first base, wherein the first base is coupled to the control unit and receives the power saving mode signal, and wherein the first emitter is grounded;

a second transistor, comprising:
a second base coupled to the first collector of the first transistor via a first resistor;
a second emitter coupled to the power supply terminal and coupled to the second base via a second resistor; and
a second collector coupled to the deflection drive terminal; and wherein the second switching unit comprises a third transistor comprising:
a third base coupled to the first collector of the first transistor via a third resistor a diode;
a third emitter coupled to the power supply terminal and coupled to the third base via a forth resistor; and
a third collector coupled to the heater.

2. The device of claim 1, wherein the voltage-drop unit comprises fifth resistor coupled between the third emitter and the third collector of the third transistor.

3. A device for reducing power consumption of a monitor, the monitor comprising a power supply terminal coupled to a deflection drive terminal and a heater, comprising:
a control unit configured to generate a power-saving mode signal in response to a control signal inputted from an external signal source;
a first switching unit, coupled to the control unit, configured to turn on or off the power supplied from the power-supply terminal to the deflection drive terminal in response to the power-saving mode signal;
a second switching unit coupled to the control unit, configured to turn on or off the power supplied from the power-supply terminal to the heater, in response to the power-saving mode signal; and a voltage-drop unit, coupled to the power-supply terminal and the heater, configured to lower the voltage applied from the power-supply terminal to the heater when the second switching unit is off;
wherein the control signal comprises horizontal and vertical synchronized signals, and wherein the control unit is configured to generate the power-saving mode signal when at least one of the horizontal or vertical synchronized signal is not being inputted; and
wherein the first switching unit comprises,
a first transistor, comprising a first collector, a first emitter and a first base, wherein the first base is coupled to the control unit and receives the power saving mode signal, and wherein the first emitter is grounded;
a second transistor, comprising: a second base coupled to the first collector of the first transistor via a first resistor; a second emitter coupled to the power supply terminal and coupled to the second base via a second resistor; and a second collector coupled to the deflection drive terminal;
wherein the second switching unit comprises a third transistor comprising:
a third base coupled to the first collector of the first transistor via a third resistor and a diode; a third emitter coupled to the power supply terminal and coupled to the third base via a forth resistor; and a third collector coupled to the heater.

4. The device of claim 3, wherein the voltage-drop unit comprises fifth resistor coupled between the third emitter and the third collector of the third transistor.

* * * * *